United States Patent
Bonola et al.

(10) Patent No.: US 8,694,991 B2
(45) Date of Patent: Apr. 8, 2014

(54) SERVER VIRTUALIZED USING VIRTUALIZATION PLATFORM

(75) Inventors: Thomas J. Bonola, Cypress, TX (US); Michael R. Garrett, Cypress, TX (US); John M. Hemphill, Spring, TX (US); Mike Dickson, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 409 days.

(21) Appl. No.: 12/935,152

(22) PCT Filed: Aug. 22, 2008

(86) PCT No.: PCT/US2008/074042
§ 371 (c)(1),
(2), (4) Date: Sep. 28, 2010

(87) PCT Pub. No.: WO2010/021630
PCT Pub. Date: Feb. 25, 2010

(65) Prior Publication Data
US 2011/0023031 A1    Jan. 27, 2011

(51) Int. Cl.
*G06F 9/455* (2006.01)
(52) U.S. Cl.
USPC .............................................. 718/1; 718/100
(58) Field of Classification Search
USPC .................................................... 718/1, 100
See application file for complete search history.

(56) References Cited

U.S. PATENT DOCUMENTS

| | | | |
|---|---|---|---|
| 7,370,324 B2* | 5/2008 | Goud et al. | 718/1 |
| 7,934,020 B1* | 4/2011 | Xu et al. | 709/250 |
| 8,201,166 B2* | 6/2012 | Garrett et al. | 718/1 |
| 2005/0120160 A1 | 6/2005 | Plouffe et al. | |
| 2006/0005184 A1 | 1/2006 | Tewari et al. | |
| 2006/0010433 A1 | 1/2006 | Neil | |
| 2007/0234031 A1 | 10/2007 | Garney | |
| 2008/0005222 A1* | 1/2008 | Lambert et al. | 709/203 |
| 2008/0229333 A1* | 9/2008 | Beck et al. | 719/318 |
| 2009/0132799 A1* | 5/2009 | Brumley et al. | 713/100 |
| 2011/0202927 A1* | 8/2011 | Miloushev et al. | 718/104 |

OTHER PUBLICATIONS

Zhuo et al, Remote Management with the Baseboard Management Controller in Eight-Generation Dell PowerEdge Servers, Dell Power solutions, Dell, Inc., Oct. 2004, pp. 26-29.*

* cited by examiner

Primary Examiner — Diem Cao (57) ABSTRACT

A data processing system transforms a physical server into multiple virtual servers. The illustrative data processing system comprises a physical server and a virtualization platform integrated into the physical server that is configured to run multiple operating systems simultaneously one or more physical servers. A baseboard management controller integrated into the physical server controls the virtualization platform and the operating systems including physical and virtual resources. The virtualization platform operates according to state data accessed from the baseboard management controller.

23 Claims, 6 Drawing Sheets

SERVER VIRTUALIZED USING VIRTUALIZATION PLATFORM

BACKGROUND

Virtual machine technology is used to create and concurrently run one or more guest operating systems on a physical device. One or more virtual machines can operate on a single host computing system, each including an operating system with concurrent applications.

Increases in data center density and complexity lead to increased demand for information technology efficiency and responsiveness. Thus, various operational aspects of virtualization increase in importance.

SUMMARY

Embodiments of a data processing system transform a physical server into multiple virtual servers. The illustrative data processing system comprises a physical server and a virtualization platform integrated into the physical server that is configured to run multiple operating systems simultaneously one or more physical servers. A baseboard management controller integrated into the physical server controls the virtualization platform and the operating systems including physical and virtual resources. The virtualization platform operates according to state data accessed from the baseboard management controller.

BRIEF DESCRIPTION OF THE DRAWINGS

Embodiments of the invention relating to both structure and method of operation may best be understood by referring to the following description and accompanying drawings.

DETAILED DESCRIPTION

A virtual server appliance can install a third party commercial virtual platform or hypervisor onto a physical server that transforms the physical server into a virtual "whitebox" as seen by guest operating systems. Several functional aspects of virtualization can be incorporated into a commercial hypervisor or other virtualization platform to transform a single physical server into multiple virtual servers without the limitations of a whitebox.

Pre-installed logic, such as software or firmware, in a physical server can enable virtualization platform functionality without subsequent installation of a hypervisor.

In some embodiments, the virtual server appliance can enable guest console access, thus enabling access to each of multiple virtual machines in a system. The virtual server appliance further can enable local console support, specifically direct access to each of many virtual machines without usage of a third party client and without requiring a network connection.

Figure 1A:
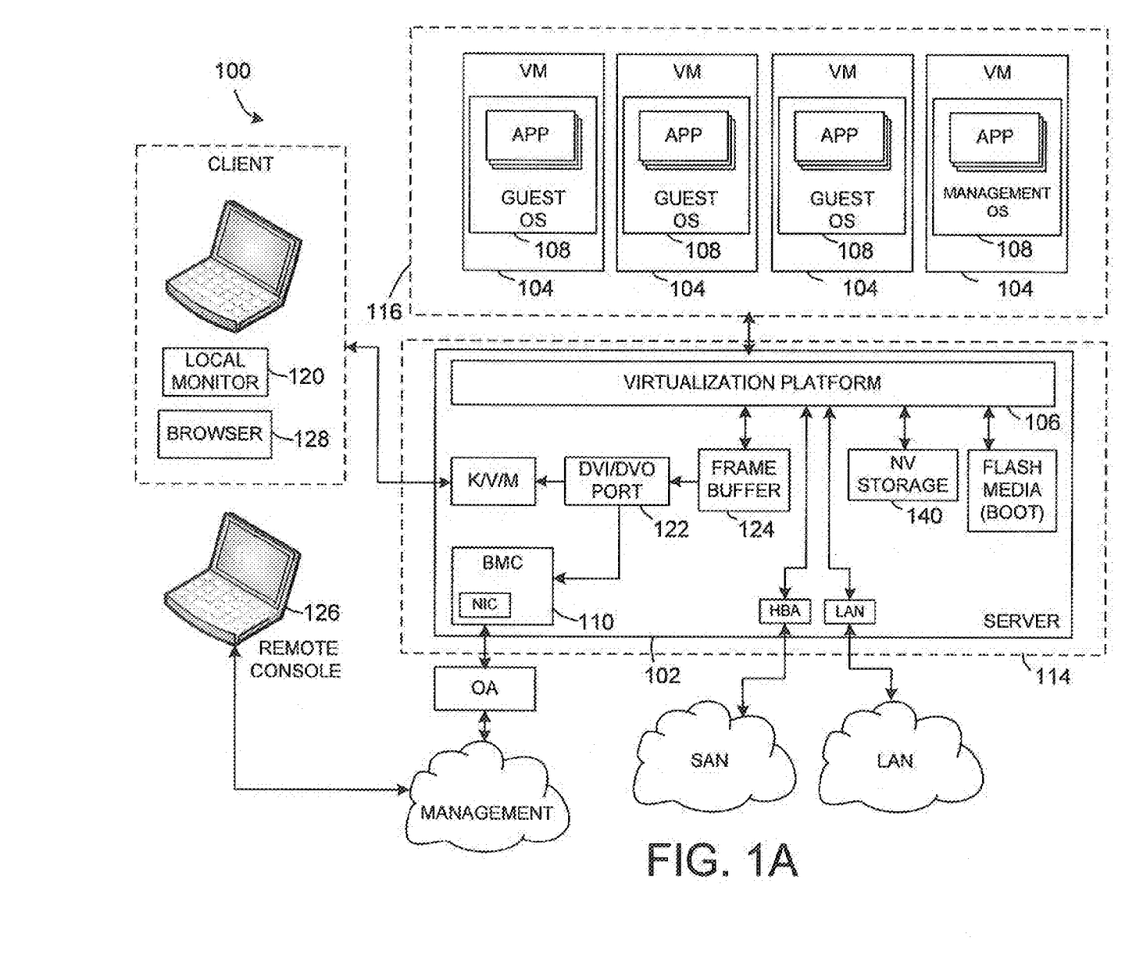
FIGS. 1A and 1B are schematic block diagrams showing embodiments of a data processing system that transforms a physical server into multiple virtual servers.

Referring to FIG. 1A, a schematic block diagram illustrates an embodiment of a data processing system 100 that can implement a virtual server appliance that transforms a physical server 102 into multiple virtual servers 104. The illustrative data processing system comprises a physical server 102 and a virtualization platform 106 integrated into the physical server 102 that is configured to run multiple operating systems 108 simultaneously on one or more physical servers. A baseboard management controller 110 integrated into the physical server 102 controls the virtualization platform 106 and the operating systems 108 including physical resources 114 and virtual resources 116. The virtualization platform 106 performs control and management actions based on state data accessed from the baseboard management controller 110.

The virtualization platform 106 can be a hypervisor, a virtual machine monitor (VMM), or other suitable virtualization system. An example implementation of the baseboard management controller 110 can be an embedded server management technology system such as integrated Lights-Out (iLO) from Hewlett-Packard Company of Palo Alto, Calif.

In an example implementation, a hypervisor 106 can be integrated into a physical server 102. The integration can reside in read-only memory (ROM) or flash media with an Original Equipment Manufacturer (OEM) version of the hypervisor pre-installed on the integrated media. When the server 102 is powered on, the hypervisor 102 boots from the integrated media (diskless) and launches the virtual machines. In the case virtual machines 104 are not yet created, then the hypervisor 106 launches management software, for example the ProLiant Virtual Console (PVC), to enable a customer to create virtual machines 106.

The baseboard management controller 110 can be configured to control the virtualization platform in conditions including powered-on, powered-off, and unbooted conditions. Other configuration options include an ability to mask physical resources from the hypervisor 106 so that the hypervisor cannot "claim" the resources for virtualization, which is particularly useful, for example, when a specific use is desired for I/O that cannot be accessed by the hypervisor.

The data processing system 100 can further comprise a local console 120. The virtualization platform 106 can be configured to enable the local graphics console 120 to access guest consoles in absence of connection to a network. A user can connect a client computer to the host through the baseboard management controller 110 over a network connection, thereby enabling the baseboard management controller 110, for example implemented as an iLO Remote Graphics Console.

The virtualization platform 106 can be implemented to enable remote graphics functionality of the baseboard management controller 110 into each guest console 126. Accordingly, the virtualization platform 106 can be configured to export a guest console to a local monitor 120 and accept local user interface signals. For example, a hypervisor can be formed to export a guest's console to the local monitor 120 and to accept local mouse and keyboard input signals. The virtualization platform 106 can export a guest console 126 to a remote graphics console through the baseboard management controller 110 to a remote client.

The baseboard management controller 110 can be further configured to monitor a Digital Video In/Digital Video Out (DVI/DVO) graphics port 122 and send data from a local physical frame buffer 124 to a remote console 126 viewed from a browser 128. In an example implementation, a baseboard management controller 110 such as iLO watches the DVI/DVO graphics port 122 and presents the data on the local physical frame buffer 124 to the remote console 126 viewed from a browser 128 over an Ethernet connection. In the illustrative implementation, a dedicated Ethernet port located on the BMC and a standalone client, typically a notebook computer, connects through the Ethernet port to the BMC and can browse to any of the VM guest consoles.

The baseboard management controller 110 can be further configured to enable remote graphics console access to a virtual guest console through an onboard administrator to the physical server 102. For example, enablement of iLO remote graphics console can enable remote graphics console access to the virtual guest console through Onboard Administrator (OA) to Blades in an enclosure.

In some embodiments, the data processing system 100 can be implemented to manage accessibility for running utilities such as test tools in a guest 108. For example, some tools or utilities can implement anti-piracy code that prevents manufacturers such as original design manufacturers (ODMs) from using the tools on hardware made available by other sources that is not specifically enabled, thus creating a challenge in virtual platform testing. A virtualization platform such as a virtual machine monitor (VMM) or hypervisor can present a non-enabled server to a guest, calling for modification of test tools or utilities to adequately test the guest environment and thus creating a risk that the tool or utility can be used on unauthorized platforms if released to the ODMs. To enable test tools to run on the guest 108, the virtualization platform 106 can be configured to write a predetermined code into a virtual Basic Input/Output System (BIOS) address for each of one or more guest virtual machines 104 which are executable on one or more physical servers 102 whereby installation of an Original Equipment Manufacturer (OEM) operating system is permitted and operating system activation is bypassed. For a commercial virtualization platform, virtual machine monitor (VMM), or hypervisor that prevents installation of OEM software operating systems, the illustrative virtual server appliance can present a predetermined data string to a specified location in a virtual BIOS address for each guest virtual machine, enabling installation of OEM operating systems, bypassing operating system operation for a user, and permitting OEM-based software to maintain license compliance. Accordingly, any OEM-based software that locks to the vendor platform can maintain license compliance.

In an example implementation, the virtualization platform 106 can be arranged to access Basic Input/Output System (BIOS) information and system information for each guest virtual machine 104 to selectively enable or disable test tools.

The virtualization platform 106 can be configured to access Basic Input/Output System (BIOS) information and system information for each guest virtual machine 104. For example, the virtualization platform 106 can surface a system SMBIOS table for each virtual machine that includes OEM-specific information located in the Type 1 System Information record.

Figure 1B:
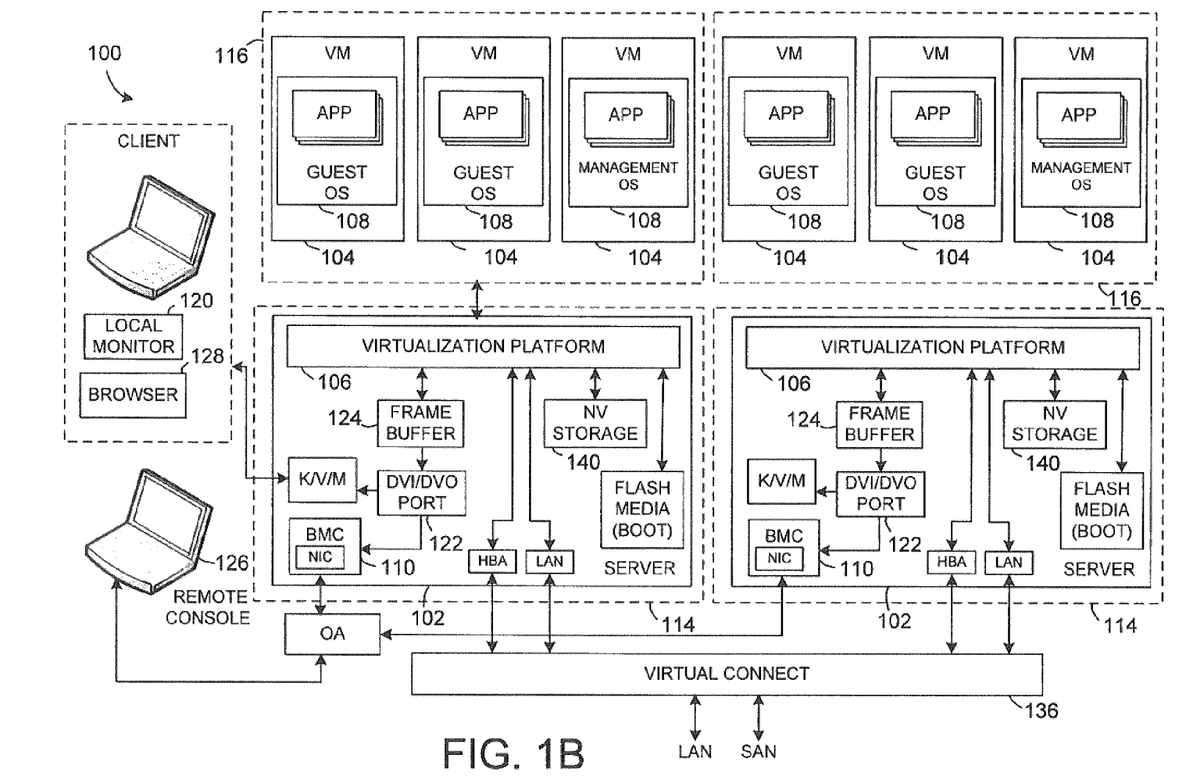

Referring to FIG. 1B, the data processing system 100 can also be implemented to enhance capabilities of the dynamic configuration and for preservation of network technologies. Virtual Connect enables a customer to have greater flexibility in configuring LAN and SAN network topologies. For example, the virtual connect device 136 can be configured to manage a pool of server profiles that include identifiers which uniquely describe a server and virtual environment parameters. The virtualization platform 106 accesses the virtual environment parameters from the server profile pool.

The virtualization platform 106 can be further configured to access the virtual environment parameters from the server profile pool in a persistent state that enables management tool access when the virtualization platform 106 is not running and the server is powered-off.

Accordingly, in a particular example, the data processing system 100 can be implemented so that the virtualization platform 106, such as a hypervisor, consumes server profile data such as World-Wide Names (WWNs), media access control (MAC) addresses, and virtual local area network (VLAN) information to preserve virtual connect attributes within an enclosure in light of physical to virtual consolidation, for example of the order of 16:1 where sixteen physical images are consolidated into sixteen virtual images running on a single server or physical Blade with the same virtual connect parameters initially configured for the images. Virtual Connect connects physical servers. The illustrative data processing system 100 and associated method enables the virtual network domain created by the hypervisor to reach into the Virtual Connect domain and vice-versa.

In some embodiments, as shown in either of FIG. 1A or 1B, the data processing system 100 can be implemented to prevent out-of-band control and/or configuration of virtual environment parameters of the virtualization platform 106. Accordingly, in some embodiments, the data processing system 100 can further comprise a non-volatile state storage 140 coupled to the physical server 102 that stores a persistent state of a server profile for the physical server 102.

For example, the data processing system 100 can be configured so that the virtualization platform 106 consumes the virtual environment parameters from persistent state data in the non-volatile state storage 140. The persistent state is accessible by the virtualization platform 106 or hypervisor running in the host domain, a BIOS utility such as a ROM-based setup utility (RBSU), input/output operations (IOP) of the baseboard management controller 110 such as iLO IOP, and the like. The virtual parameters of virtual machines (VMs), virtual central processing units (vCPUs), virtual random access memory (vRAM), virtual storage (vDISKs), virtual network interface controllers (vNICs), and the like are maintained in persistent state to enable management tool access to "hypervisor state" when the hypervisor or other virtualization platform 106 is not running and the server 102 is powered-off, for example on auxiliary power (aux-power).

Figure 2:
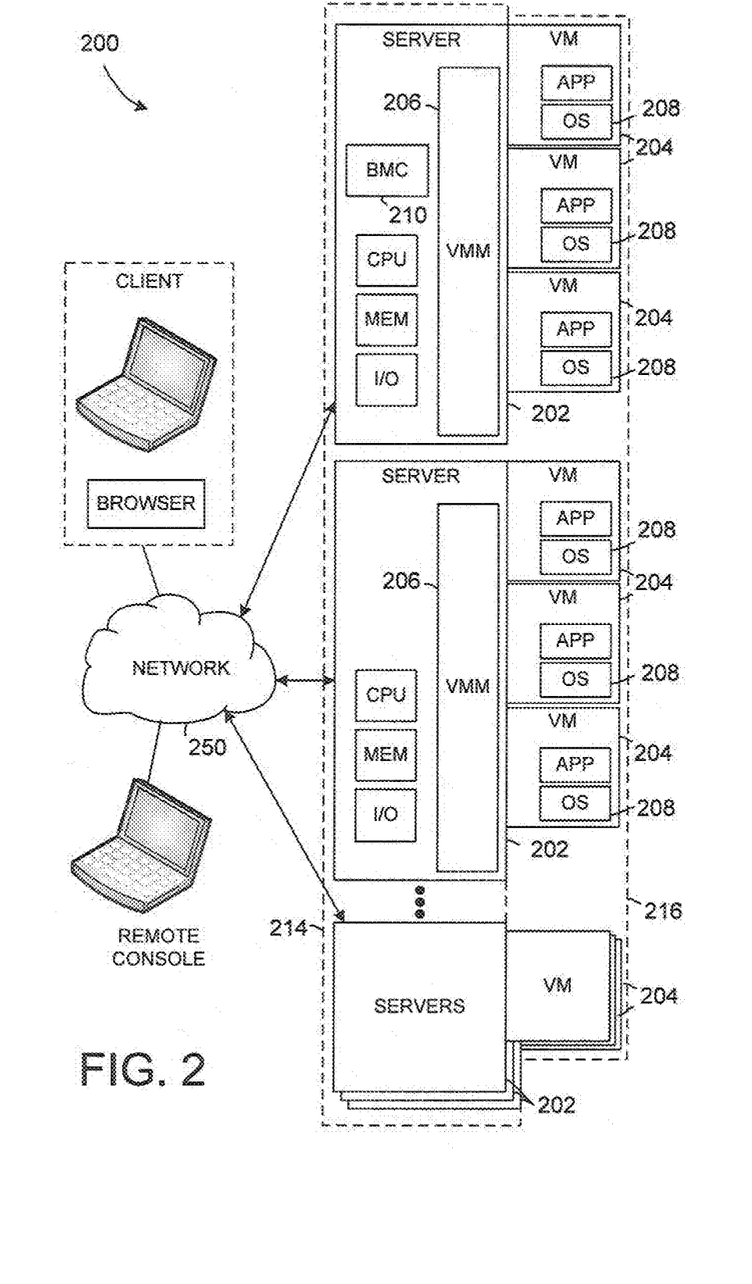
FIG. 2 is a schematic block diagram depicting another embodiment of a data processing system that transforms a physical server into multiple virtual servers.

Referring to FIG. 2, a schematic block diagram depicts another embodiment of a data processing system 200 that transforms a physical server 202 into multiple virtual servers 204. The illustrative data processing system 200 comprises a network 250, multiple physical servers 202 communicatively coupled to the network 250 and a virtualization platform 206 which is configured to run multiple operating systems 208, and the multiple operating systems 208 simultaneously running on at least one physical server. The virtualization platform 206 is integrated into a physical server 202 and can run multiple operating systems 208 simultaneously on a physical server. A baseboard management controller 210 integrated into the physical server 202 controls the virtualization platform 206 and the operating systems 208 including physical resources 214 and virtual resources 216. The virtualization platform 206 performs control and management actions based on state data accessed from the baseboard management controller 210.

Figure 3A:
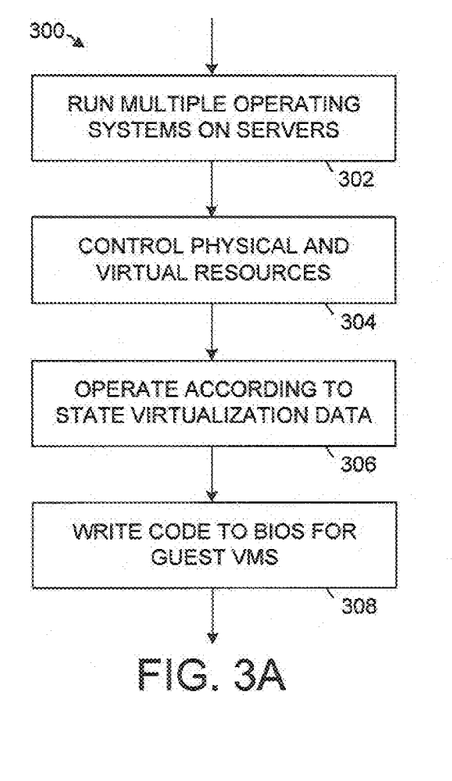
FIGS. 3A through 3D are flow charts illustrating one or more embodiments or aspects of computer-executed methods for transforming a physical server into multiple virtual servers.

Referring to FIGS. 3A through 3D, flow charts illustrate one or more embodiments or aspects of a computer-executed method 300 for transforming a physical server into multiple virtual servers. FIG. 3A depicts a computer-executed method for operating 300 a virtualized computing system which comprises running 302 multiple operating systems simultaneously on one or more physical servers and controlling 304 physical and virtual resources of a virtualization configuration and the operating systems. The system operates 306 according to state data designating the virtualization configuration.

In some embodiments, system operation can be governed by writing 308 a predetermined code into a virtual Basic Input/Output System (BIOS) address for each of one or more guest virtual machines which execute on the physical servers. For example, system operations can be controlled so that installation of an Original Equipment Manufacturer (OEM) operating system is permitted and operating system activation is bypassed.

Figure 3B:
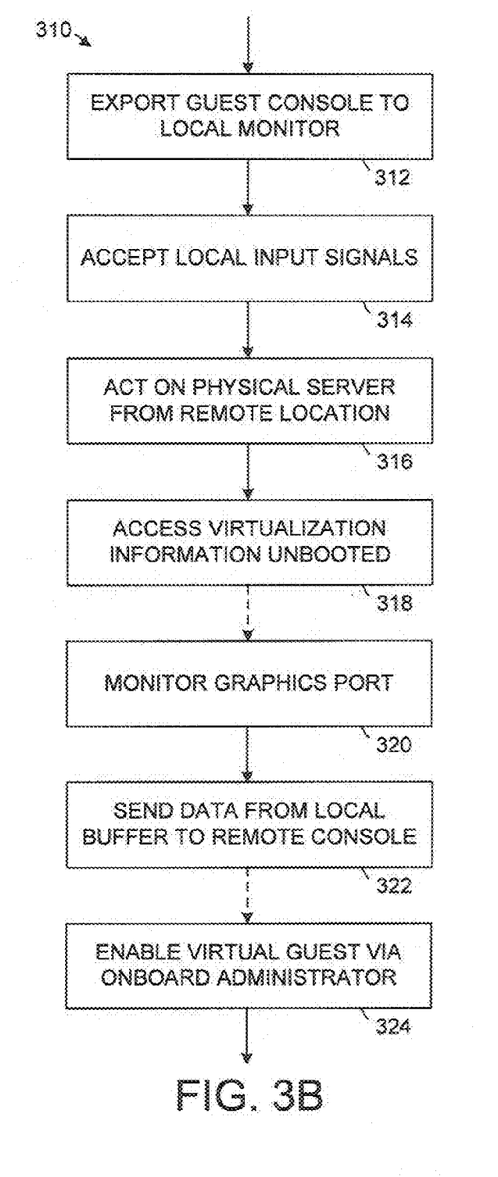

As shown in FIG. 3B, a computer-executed control method 310 can comprise exporting 312 a guest console to a local monitor, accepting 314 local mouse and keyboard input signals, and performing 316 operations on a physical server from a remote location. Virtualization configuration information on auxiliary-power-only can be accessed 318 when the physical server is unbooted or powered-off. The method 312 can further comprise monitoring 320 a Digital Video In/Digital Video Out (DVI/DVO) graphics port and sending 322 data from a local physical frame buffer to a remote console viewed from a browser.

The guest console can be exported 312 to the local monitor according to selection between two usage models in various conditions and circumstances. For example, the guest console can be exported 312 to a local monitor and guest consoles can be accessed via the local monitor in absence of a connection between the physical server and the network. For network usage, the guest console can be exported 312 to the local monitor and the guest consoles accessed through the network via a baseboard management controller. The baseboard management controller can be operated to monitor local server graphics activity to a local framebuffer and transmit differences in the graphics activity to a target guest console.

In a system that implements an embedded server management technology system such as integrated Lights-Out (iLO), a user can select between two usage models that operate with or without the iLO and network access. The first usage model operates with pure local console access to guest consoles without connecting the physical server to a network. The second usage model operates with Remote Graphics Console access to guest consoles via an iLO Network Interface Controller (NIC), since iLO monitors local server graphics activity to a local frame buffer through the DVI output port and pumps the differences to the remote client over the iLO NIC, a technique which easily scales to enable Remote Graphics Console access to guest consoles through the Onboard Administrator (OA).

In some implementations, remote graphics console access to a virtual guest console can be enabled 324 through an onboard administrator to the physical server or servers.

Figure 3C:
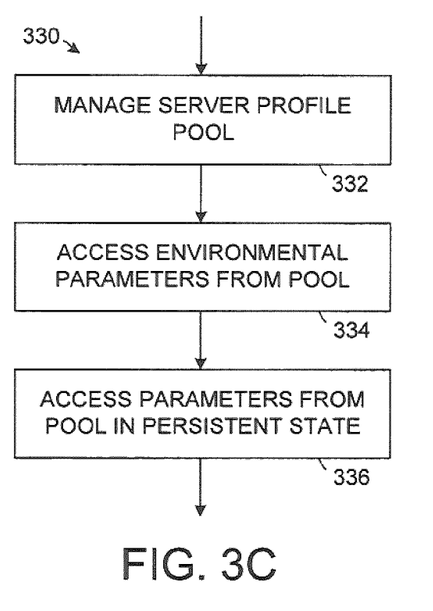

Referring to FIG. 3C, a computer-executable control method 330 can comprise managing 332 a pool of server profiles made up of identifiers that uniquely describe server and virtual environment parameters. The virtual environment parameters are accessed 334 from the server profile pool.

The virtual environment parameters can be accessed 336 from the server profile pool in a persistent state that enables management tool access when the virtualization platform is not running and the server is powered-off.

Figure 3D:
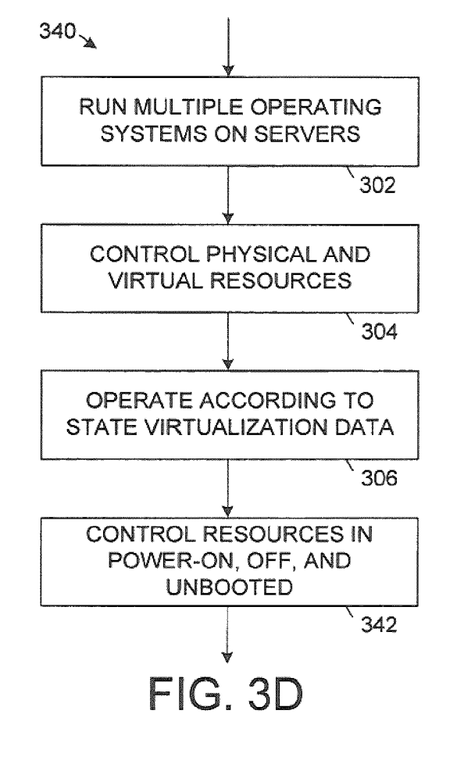

Referring to FIG. 3D, in some embodiments 340 physical and virtual resources of the virtualization configuration and the operating systems can be controlled 342 in conditions including powered-on, powered-off, and unbooted conditions, as well as enable physical resource masking to prevent the hypervisor from accessing the masked resources for virtualization.

Figure 4A:
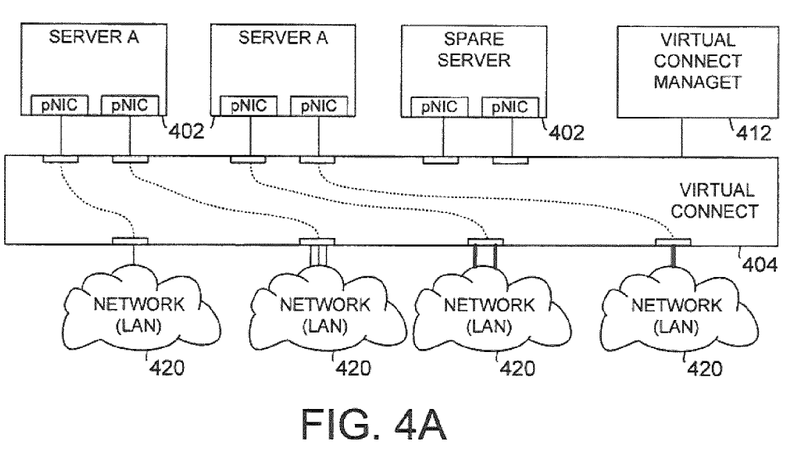
FIGS. 4A and 4B are schematic block diagrams illustrating an embodiment of a virtual connect that can be used in a data processing system or virtualized network system.
Figure 4B:
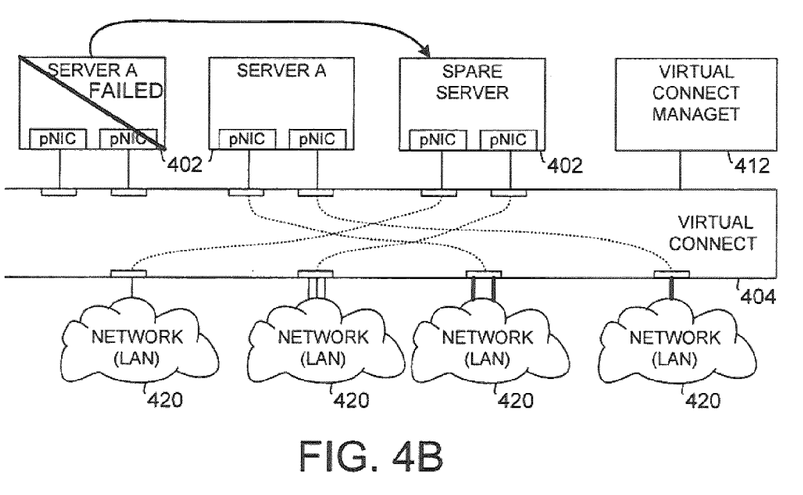

Referring to FIGS. 4A and 4B, schematic block diagrams illustrate an embodiment of a virtual connect 404 that can be used in a data processing system or virtualized network system. Virtual connect 404 can implement server-edge input/output (I/O) virtualization by interposing an abstraction layer between the servers 402 and external networks so that a local area network (LAN) 420 and storage area network (SAN) see a pool of servers rather than individual servers. LAN 420 and SAN connections are made to the pool of servers, and a server administrator uses a virtual connect manager user interface to create an I/O connection profile for each server. Instead of using default media access control (MAC) addresses for all network interface controllers (NICs) and default World Wide Names (WWNs) for all host bus adapters (HBAs), the virtual connect manager 412 creates bay-specific I/O profiles, assigns unique MAC addresses and WWNs to the profiles, and administers the profiles locally. Local administration of network addresses is applied by virtual connect so that network and storage administrators can establish all LAN and SAN connections once during deployment and not subsequently make connection changes if servers are changed. As servers are deployed, added, or changed, virtual connect maintains the I/O profile for that LAN and SAN connection constant.

Virtual connect manager 412 facilitates upgrade and/or replacement of a server 402 by enabling the server administrator to reassign the I/O profile to a new server. Also, virtual connect manager 412 enables the administrator to move a virtual connect profile from a failed server to a spare server, all functionality that can be embedded in a virtual connect module. FIG. 4B depicts migration showing an administrator moving Ethernet MACs, Fibre Channel WWNs, and Fibre Channel boot parameters of a failed server to a spare server.

The non-volatile state storage or persistent state technology can be used to extend functionality of a virtualization platform. A conventional virtualization platform is managed as any typical operating system or software loaded on physical computer system hardware wherein the configuration can only be managed when the virtualization platform is booted and running. Configuration data that backs the virtualization platform configuration in a conventional system is not tied in any way to the hardware upon which the platform resides except perhaps on a hard disk, which is replaceable.

The non-volatile state storage persistent state technology described herein recognizes that a virtualization platform creates multiple virtual machines to the user of a computer system and can thus be considered by the user to be an extension of the computer hardware itself rather than simply software running on the hardware. Accordingly, improved functionality can be attained by managing operations as an extension of computer hardware, enabling users to manage the virtualization platform configuration with the same level of capability as for management of physical hardware. The non-volatile state storage, persistent state technology further includes a capability to configure remotely from a management console even when the computer's main power is disabled. The configuration data is tied to the physical hardware.

The non-volatile state storage comprises a data storage repository tied to the physical computer hardware and a data format that govern the virtualization platform configuration.

In an example embodiment, the persistent state enables off-line edits of the virtualization platform configuration by software and firmware, even in powered-off states where only aux-power is supplied to the system. The configuration items of interest can be virtual machines, networks, virtual disk images, physical resource reservations, and the like.

Virtual machine configuration can be controlled using create, delete, edit, add network interface controller (NIC), delete NIC, edit NIC, add storage controller, delete storage controller, and edit storage controller. Virtual machine edits can apply to name, description, serial number, Universally Unique IDentifier (UUID), default power state, memory configuration, CPU configuration, preboot execution environment (PXE) configuration, and boot order. Network interface controller (NIC) edits can apply to name, network, media access control (MAC) addresses, and the like. Storage controller edits can apply to name, virtual disk image name, bootable, writable, and selection of CD/DVD versus hard disk.

The non-volatile state storage can be used in virtualization platform creation and management of networks and virtual disk images. Other components can only reference the networks by name.

The non-volatile state storage can be used for physical resource reservations applied to CPUs, memory, peripheral component interconnect (PCI), I/O ports, and the like.

The persistent state can be synchronized with native configuration data by operation of the virtualization platform which honors the persistent state at startup and monitors persistent state periodically for changes during uptime. The virtualization platform can be made responsible for all reconciliation between persistent state and internal native configuration including remote resource pools. For example, the virtualization platform can implement periodic 2-way synchronization. Online changes to the virtualization platform configuration are written back to persistent state so that management tools can read an accurate configuration. To ensure efficiency, all writers including the virtualization platform can be implemented to avoid unnecessary writes and limit rewrites to changes in configuration.

The non-volatile state storage comprises a data repository. For example, a persistent system state can be stored in a primary partition on embedded media and can be marked with a non-standard partition type. The format of the partition is not a file system. Instead each consecutive linear sector number is mapped into contiguous memory, so that the contents become memory-mapped. Modifications can occur in memory and the memory is mapped directly back to sector numbers and written to the mass storage device. Some implementations of the partition can be storage on a Universal Serial Bus (USB) key, secure data card, or the like located inside the computer chassis. The simple sector-to-memory mapping enables non-file-system-aware software to read and write the data without having to implement file system support.

Persistent state can be implemented in different storage media and devices including NVRAM, ROM Flash sectors, USB Flash media, and others.

In an example implementation, the flash device containing the persistent state bits may be present on any USB storage device. Externally accessible USB ports are given priority over internal ports for both booting the hypervisor and accessing persistent state. Readers and writers of persistent state scan attached USB storage in priority order to find persistent state. Persistent state can be stored in a primary partition on the flash media and marked with a non-standard partition type indicating that the media is solely for the purpose of supporting an integrated virtualization platform. The format of the partition is not a file system. Instead each consecutive linear sector number is mapped into contiguous memory, so that the contents become memory-mapped. Modifications can occur in memory and the memory is mapped directly back to sector numbers and written toy the key/card.

Once memory-mapped, the data remains unsuitable for editing. The format of the data and the fact that the virtualization platform does not include the persistent state as a native configuration file means that all software readers and writers are to "unpack" the data for editing, and "repack" for writing. A characteristic that does not imply compression or encryption but simply means that the data structure does not have fixed sizes for strings, for example, so as strings increase in length, the remainder of the data structure shifts. Thus, most writers unpack the structure allowing each string sufficient room during editing. Similarly, the number of virtual machines can change, causing shifts in the remaining data.

Readers and writers of the persistent state storage can include virtualization platform software and management software such as baseboard management controller firmware, BIOS setup, and the like, which can read and write the persistent state data. In some implementations, the data structure can include a semaphore mechanism to prevent write-concurrency corruption.

Concurrent access of the non-volatile state storage is enabled with some constraints to ensure correct operation. Several software and firmware components can be readers and writers of persistent state including the virtualization platform, a software component that runs after boot but executes after the virtualization platform starts as part of the boot chain, a ROM-based setup utility that runs at user request and exits prior to boot, and the baseboard management controller, an asynchronous management processor that can alter parameters in power-on, power-off, or on auxiliary power.

Atomic commits are used to safely write persistent state in a multiple-writer environment. For example, in a configuration for which baseboard management controller does not write to the non-volatile state storage, atomic commits are not necessary. In configurations that the baseboard management controller does write to non-volatile state storage, atomic commits can be controlled by a memory-mapped semaphore protocol, for example as defined by baseboard management controller firmware. A suitable write procedure can include finding the semaphore control structure in memory, searching a legacy BIOS range for a marker, parsing the data structure at the marker which points to the semaphore structure, following the pointer to the semaphore structure in the address space, and accessing the semaphore for control.

The data format or layout of the illustrative non-volatile state storage takes into consideration that some of the critical readers and editors of the persistent state are "primitive" in that access to a file system, an I/O library, string libraries, or networking, is not enabled and are implemented in assembly language. As a consequence, eXtensible Markup Language (XML) is not a viable choice considering the complexity and variable length string operations. A constant-sized structure is inappropriate for primitive software since such a structure is non-extensible (and therefore hard to version-control), and strings and arrays would have to be of predetermined size resulting in wasted space or future limitations.

In light of the two opposing goals of XML-like extensibility and ease of parsing for primitive software, the illustrative non-volatile state storage implements a format that combines binary data structures with hierarchy and extensibility.

The data format proposed herein is based upon binary data instead of strings, and is thus simple for low-level software to parse. However, because the data format is extensible, no version management difficulties are imposed and robust handling of unknown data elements as well as missing data elements is supported. The hierarchical nature of the format enables data to be logically organized in a tree-like structure. Signatures that define separate elements of data are strongly typed and divided into namespaces to prevent data definition collisions between hardware and virtualization platform suppliers.

An example data format includes persistent state configuration data that is preceded by a header that contains basic integrity and schema version information. Given the two opposing goals of XML-like extensibility and ease of parsing for primitive software, the result is a compromise best likened to a binary XML format which, from a parsing perspective, is similar to SMBIOS except being hierarchical instead of linear. Binary XML format combines the byte packing and type iteration of SMBIOS with the hierarchy of XML and has characteristics of constant-sized elements declarations, only a single root element in the manner of XML, no attributes, and elements that can either contain child elements or a predefined binary data structure (in place of XML child text) associated with the element signature. For parsers to handle unknown element signatures, the element signature has a bit that determines type, for example 1=child elements, 0=structure.

An element declaration can be defined as multiple bit fields with each element string given an identifier, an indication of children or structure. For a name with a child text string, a binary structure is created. An in-memory binary data structure can include a sequence of, for example, a virtual machine root element signature, a number of children elements, and one or more virtual machine element signatures, each including a number of child elements, a name element signature, structure length, and binary structure (string).

Element namespaces can be assigned in accordance with an intention of the persistent state format is to be extensible like traditional XML. Thus element value assignments can be formed to ensure conflict-free usage. A subset of element value bits can thus be reserved for company signature. Since the purpose of persistent state is for proprietary management of the virtualization platform, configuration data that is to be managed can be specified to be assigned according to the company signature. Thus, the company namespace can be given priority when storage space is limited.

For unknown elements, defined as elements that may be written that are not understood by all parsers, several rules can be applied. First, every writer is to preserve elements that are not understood, including order and hierarchy. Second, readers can traverse unknown elements according to a bit in the element signature and a count following the element signature to iterate through child elements and skipping over data structures. Persistent state can be presumed to not be the native configuration file for the virtualization platform, so if virtualization platform-specific elements are missing default values or values from the native configuration file can be assumed as appropriate.

Missing and/or optional elements can be handled according to several rules. If an element is missing that contains a data structure child, a clear set of default values is specified. If a child element is missing from a set owned by a parent, the set is likely changed purposely changed and the virtualization platform acts accordingly.

The illustrative non-volatile state storage and implementation of embedded persistent state on a computer system, in combination with the proposed data format that enables data to be read and written by low-level software and firmware enable the virtualization platform to read and honor changes made by a management processor when a computer is powered-off. A user can configure virtual machines much like physical machines from a BIOS setup utility before the virtualization platform boots. The persistent data is embedded in the physical computer hardware, reducing dependencies upon removable hard disks and network access.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for managing virtual machines (VMs) in a distributed network system.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
    a physical server;
    a virtualization platform, integrated into the physical server, to run a plurality of operating systems simultaneously on at least one physical server based on persistent state data, the persistent state data comprising virtualization configuration information;
    a non-volatile state storage, coupled to the physical server, to store the persistent state data; and
    a physical baseboard management controller, integrated into the physical server, to edit the persistent state data when the virtualization platform is not running.

2. The system according to claim 1, wherein the virtualization platform is to write a predetermined code into a virtual Basic Input/Output System (BIOS) address for each of at least one guest virtual machine executable in the at least one physical server.

3. The system according to claim 1 further comprising:
a local graphics console, wherein the virtualization platform is to enable the local graphics console to access guest consoles in absence of a connection to the network.

4. The system according to claim 1, wherein the physical virtualization platform is to export a guest console to a remote graphics console through the baseboard management controller to a remote client.

5. The system according to claim 4, wherein the physical baseboard management controller is to monitor a Digital Video In/Digital Video Out (DVI/DVO) graphics port and send data from a local physical frame buffer to the remote graphics console viewed from a browser.

6. The system according to claim 5, wherein the physical baseboard management controller is further to enable the remote graphics console to access the guest console through an onboard administrator to at least one physical server.

7. The system according to claim 1, wherein the virtualization platform is to access virtual Basic Input/Output System (BIOS) information and system information for each guest virtual machine.

8. The system according to claim 7, wherein a predetermined code included in the virtual BIOS information specifies whether one or more test tools are enabled or disabled.

9. The system according to claim 1 further comprising:
a virtual connect device to manage a pool of server profiles that comprise identifiers uniquely describing a server and virtual environment parameters, wherein the virtualization platform is further to access the virtual environment parameters from the server profile pool.

10. The system according to claim 1, wherein the persistent state data comprises a binary data format, and wherein the persistent state data is organized in a hierarchical structure.

11. The system according to claim 1, wherein the persistent state data comprises a semaphore mechanism to prevent write-concurrency corruption.

12. The system according to claim 1, wherein the non-volatile state storage uses a sector-to-memory mapping to store the persistent state data in.

13. A computer-executed method for operating a virtualized computing system comprising:
storing, in a non-volatile state storage, persistent state data comprising configuration information for a virtualization platform included in at least one physical server;
editing, by a physical baseboard management controller, the persistent state data while the virtualization platform is not running; and
running a plurality of operating systems simultaneously on the at least one physical server according to the edited persistent state data.

14. The method according to claim 13 further comprising:
writing a predetermined code into a virtual Basic Input/Output System (BIOS) address for each of at least one guest virtual machine executable in the at least one physical server whereby installation of an Original Equipment Manufacturer (OEM) operating system is permitted and operating system activation is bypassed.

15. The method according to claim 13 further comprising:
exporting a guest console to a local monitor;
accessing guest consoles through a network via the physical baseboard management controller; and
operating the physical baseboard management controller comprising monitoring local server graphics activity to a local framebuffer and transmitting differences in the graphics activity to a target guest console.

16. The method according to claim 13 further comprising:
managing a pool of server profiles that comprise identifiers uniquely describing a server and virtual environment parameters; and
accessing the virtual environment parameters from the server profile pool.

17. The method according to claim 13, wherein the persistent state data comprises a binary data format, and wherein the persistent state data is organized in a hierarchical structure.

18. The method according to claim 13, wherein the persistent state data comprises a semaphore mechanism to prevent write-concurrency corruption.

19. The method according to claim 13, wherein storing the persistent state data in the non-volatile state storage comprises using a sector-to-memory mapping.

20. A non-transitory storage medium having computer readable program code embodied therein, the program code to be executed by a hardware processor to:
store, in a non-volatile state storage, persistent state data comprising configuration information for a virtualization platform included in at least one physical server;
edit, by a physical baseboard management controller, the persistent state data while the at least one physical server is not running; and
run a plurality of operating systems simultaneously on at least one physical server according to the edited persistent state data state data.

21. The non-transitory storage medium according to claim 20, wherein the persistent state data comprises a binary data format, and wherein the persistent state data is organized in a hierarchical structure.

22. The non-transitory storage medium according to claim 20, wherein the persistent state data comprises a semaphore mechanism to prevent write-concurrency corruption.

23. The non-transitory storage medium according to claim 20, wherein storing the persistent state data in the non-volatile state storage comprises using a sector-to-memory mapping.

* * * * *

UNITED STATES PATENT AND TRADEMARK OFFICE
CERTIFICATE OF CORRECTION

| | | |
|---|---|---|
| PATENT NO. | : 8,694,991 B2 | Page 1 of 1 |
| APPLICATION NO. | : 12/935152 | |
| DATED | : April 8, 2014 | |
| INVENTOR(S) | : Thomas J. Bonola et al. | |

It is certified that error appears in the above-identified patent and that said Letters Patent is hereby corrected as shown below:

In the Claims

Column 12, line 13, in Claim 15, delete "framebuffer" and insert -- frame buffer --, therefor.

Column 12, line 41, in Claim 20, delete "state data state data." and insert -- state data. --, therefor.

Signed and Sealed this
Second Day of September, 2014

Michelle K. Lee
*Deputy Director of the United States Patent and Trademark Office*